(12) United States Patent
Ruff et al.

(10) Patent No.: US 8,292,565 B1
(45) Date of Patent: Oct. 23, 2012

(54) A AND R SAFETY RAMPS

(76) Inventors: James Bentley Ruff, Starr, SC (US); Timothy W. Agnew, Starr, SC (US)

(*) Notice: Subject to any disclaimer, the term of this patent is extended or adjusted under 35 U.S.C. 154(b) by 1023 days.

(21) Appl. No.: 12/077,032

(22) Filed: Mar. 14, 2008

(51) Int. Cl.
*B60P 1/04* (2006.01)

(52) U.S. Cl. ............... 414/480; 414/812; 14/71.1

(58) Field of Classification Search .......... 414/430, 414/465, 480, 537, 556, 557, 575, 576, 812, 414/462, 546; 296/26.1, 26.08, 61, 37.5; 14/69.5, 71.1, 72.5
See application file for complete search history.

(56) References Cited

U.S. PATENT DOCUMENTS

| | | | |
|---|---|---|---|
| 3,674,167 A * | 7/1972 | Roberts | 414/484 |
| D316,771 S | 5/1991 | Murray | |
| 5,295,555 A | 3/1994 | Strange | |
| 5,649,732 A | 7/1997 | Jordan et al. | |
| 5,678,984 A * | 10/1997 | Petersen | 414/537 |
| 6,076,215 A | 6/2000 | Blankenship et al. | |
| 6,102,646 A * | 8/2000 | Bass et al. | 414/537 |
| 6,250,874 B1 * | 6/2001 | Cross | 414/537 |
| 6,379,101 B1 | 4/2002 | Breaux | |
| 6,536,822 B1 | 3/2003 | Vagedes et al. | |
| 6,647,898 B2 * | 11/2003 | Li | 105/458 |
| 6,682,292 B2 * | 1/2004 | Estes | 414/462 |
| 6,698,994 B2 * | 3/2004 | Barrett | 414/462 |
| D505,238 S | 5/2005 | Robertson | |
| 2002/0136621 A1 | 9/2002 | Scherle | |
| 2005/0036869 A1 | 2/2005 | Negranti | |
| 2005/0263555 A1 * | 12/2005 | Hail et al. | 224/402 |
| 2006/0133915 A1 | 6/2006 | Day | |
| 2006/0177294 A1 * | 8/2006 | Garbes | 414/537 |
| 2008/0159838 A1 * | 7/2008 | Sherer | 414/537 |

* cited by examiner

*Primary Examiner* — Saul Rodriguez
*Assistant Examiner* — Glenn Myers
(74) *Attorney, Agent, or Firm* — Cort Flint; Henry S. Jaudon; Monahan & Moses, LLC

(57) ABSTRACT

A lightweight ramp locking assembly for use with a vehicle having a hitch receiver, a bed with sides and a tailgate. The assembly is connectable with the hitch receiver and positionable in a vertical locking position and a diagonal loading position. The assembly is firmly secured with the vehicle to be incapable of rotating movement.

9 Claims, 4 Drawing Sheets

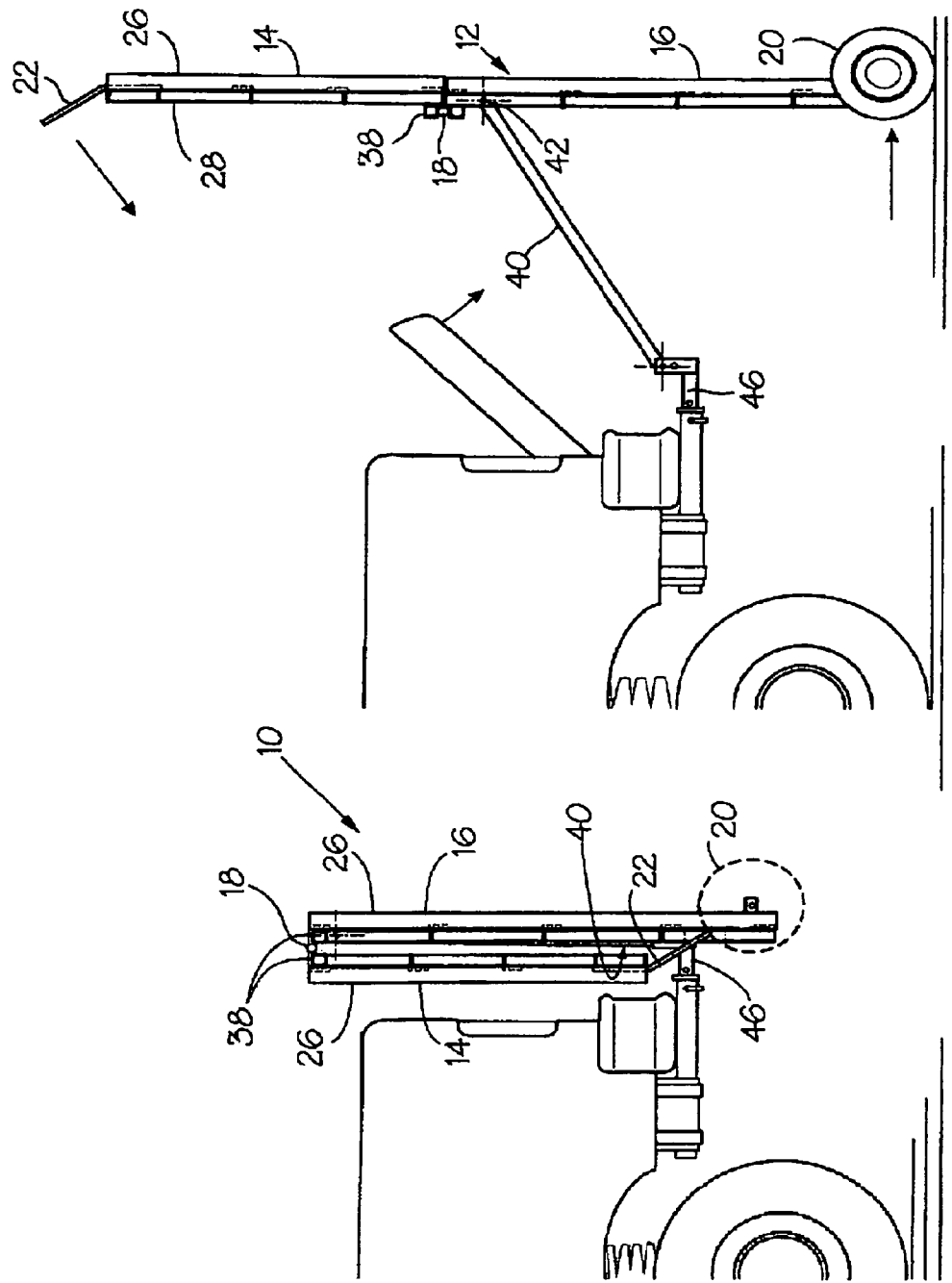

A AND R SAFETY RAMPS

BACKGROUND OF THE INVENTION

This invention is directed to a locking ramp assembly for use with a vehicle, normally a pickup truck. The assembly is preferably made of aluminum to be lightweight and easily engaged with or disengaged from the vehicle by a single person. The assembly, in its locked position, acts to prevent the tailgate from opening, and in its ramp position, is locked against sliding longitudinally, rotation or overturning.

SUMMARY OF THE INVENTION

A ramp assembly for use on vehicles and especially pickup trucks, having a hitch receiver and a bed with a tailgate. The ramp assembly, which is preferably made of aluminum, includes a ramp positionable between a generally vertical locking position and a generally diagonal loading position. The ramp includes an upper section and a lower section pivoted together at adjacent ends. A support beam is pivoted at a first end with the lower section adjacent its pivoted end. A hitch bar, which is adapted to be received in and locked with a receiver carried by the truck, is formed with an extension extending generally vertically from one end. The extension includes a pivot and a locking unit for pivotally mounting or fixedly locking the support beam. The support beam in combination with the hitch bar and the receiver act to prevent rotational and longitudinal movement of the ramp when in the loading position.

In use, the support beam is pivotally connected with the extension at a second end and is movable between a generally vertical locked position in which the upper and lower ramp sections extend generally vertically beyond the tailgate preventing it from opening and a generally diagonal loading position in which the upper and lower ramp sections are held in a generally fixed position along a diagonal plane with a second end of the upper ramp section resting on the tailgate and the second end of the lower ramp section resting on the ground.

The ramp sections each comprise flooring made of metal screening with 2×4 angle rods forming side rails and end rails. Intermediate and longitudinal support members preferably comprise 2×2 angle rods are arranged between the side rails. The support beam is pivotally connected between adjacent ones of the intermediate longitudinal support members.

The second end of the upper ramp section includes a spaced pair of shaped tongs which engage the upper ramp section with the tailgate when the ramp assembly is in the loading position.

The ramp assembly includes a pair of wheels connected with opposite sides of the lower ramp section adjacent its second end. The wheels act to assist in transporting the ramp assembly between storage and the vehicle to which it is to be mounted.

The lock assembly, between the hitch bar extension, comprises aligned holes through the extension and the support beam which receives a locking member which locks the support beam in vertical position with the extension.

The support beam is of a length greater than the upper ramp section which allows the upper section to be folded and positioned parallel with the lower ramp section during storage and in the locking positions.

The support members and side rails of the upper and lower ramp sections provide additional support for the extended ramp because adjacent vertically extending portions of the support members and side rails are engaged when the ramp is in the loading position.

The invention includes the method of mounting a ramp locking assembly with a vehicle having a hitch receiver and includes the steps of:
  providing a ramp having an upper section pivoted with a lower section, a support beam pivotally connected at one end with the lower ramp section and pivotally connected at a second end with a hitch bar;
  providing the lower end of the lower ramp section with a pair of wheels adjacent its second end;
  arranging the upper and lower ramp sections of the assembly in parallel position with the wheels supporting the ramp assembly and locating the hitch bar in a position perpendicularly of the support beam;
  rolling the assembly into position adjacent the hitch receiver mounted on the vehicle;
  positioning an end of the hitch bar into an open end of the receiver, pushing the hitch bar into the receiver and locking the hitch bar with the receiver positioning the assembly in fixed vertical position behind the tailgate blocking movement of the tailgate into the open position.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 3A is a side view of the ramp assembly in the vertical locking position.

FIG. 3B is a side view of the locking ramp assembly in the loading position.

DESCRIPTION OF A PREFERRED EMBODIMENT

Referring now in more detail to the drawings, the invention will now be described in more detail.

Figure 1:
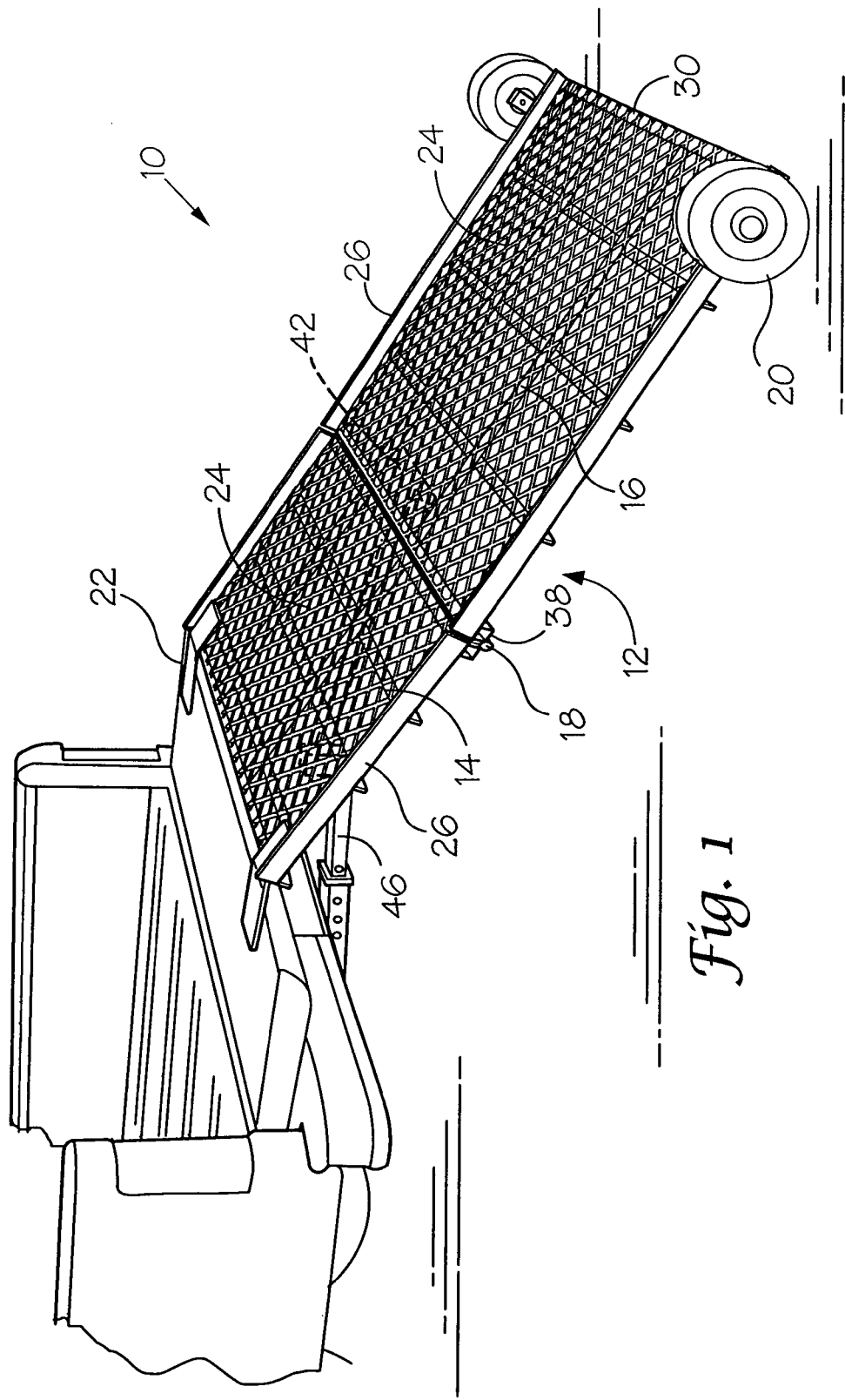
FIG. 1 is a perspective view of the ramp assembly in the loading position.
Figure 2:
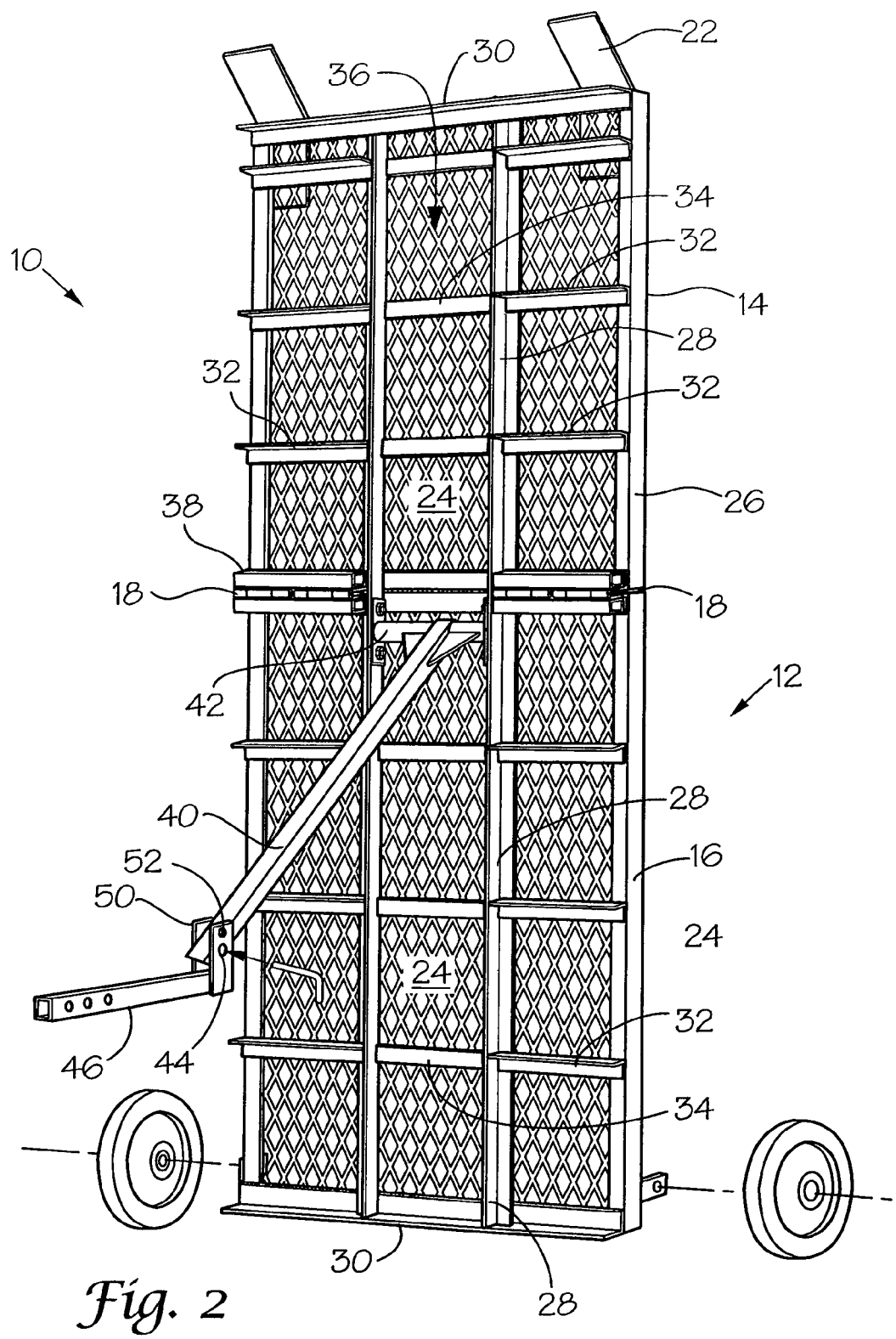
FIG. 2 is a perspective view of the ramp assembly.

Turning now to the drawings and particularly to FIGS. 1 and 2, the ramp assembly 10 is shown. The assembly 10 includes ramp 12 comprised of upper ramp section 14 and lower ramp section 16 inter-connected at adjacent ends by a pair of pivots 18. Connected to the lower or opposite end of lower ramp section 16 is a pair of wheels 20. Connected with the opposite or upper end of upper ramp 14 is a pair of ears 22.

Each ramp section 14, 16 comprises a bed 24 formed of metal screen. Each side of each screen is connected with an angle rod 26 preferably 2"×4" with the 2" side connected beneath the screen and the 4" portion extending above the upper surface acting as a side rail. Also, connected with the underside of upper and lower ramp sections 14, 16 are a pair of longitudinally extending support members 28. Connected with opposed ends of ramp sections 12, 14 and with the ends of longitudinal support members 28 and angle irons 26 are transverse support members 30 preferably formed of 2×2 angle rods. In between end support members 30 are additional transverse support members 32 which may comprise individual sections of 2×2 angle rods each connected along its upper surface with bed 24 and its opposed ends with longitudinal support members 26, 28.

Transverse flat support members 34 located between longitudinal support members 28 are formed of 2"×¼" flat metal members connected with bed 24 along its upper surface and with longitudinal support members 28 at its ends. A channel 36 is formed between longitudinal support members 28 by the use of flat support members 34.

Channel 36 receives support beam 40 when the ramp assembly 10 is arranged with upper and lower sections 14 and 16 in folded engagement as shown in FIG. 3A.

Turning now to the two pivots 18, which are arranged on opposite each side of channel 36 and are connected with the end transverse support members 38 arranged at adjacent and opposed ends of upper and lower ramp sections 14 and 16. End transverse support member 38 may comprises a 2"×2"×2" triangular tube member or they could be formed of 2×2 square tube members, the latter providing additional support against the additional stress caused by the pivots. See FIGS. 2, 3A and B.

Support beam 40 is pivotally connected at pivot 42 to inner longitudinal support members 28 adjacent to the upper end of lower ramp section 16. Support beam 40 is preferably a 2"×2" square tube of a length slightly greater than the length of upper ramp section 14 but less than lower ramp section 16. The lower end of support beam 40 is pivotally mounted at 44 with hitch bar 46. Hitch bar 46 is of usual size to be received in receiver 48 which is preferably the receiver of a REESE type hitch arrangement. As is usual, hitch bar 46 includes a plurality of receiver holes which allow the hitch bar to be mounted at varying longitudinal distances with the receiver. A pin and lock pass through aligned holes in both the hitch bar and receiver to lock the hitch bar in position, as is usual. A padlock may be used to secure the pin against removal.

The outer end of hitch bar 46 includes a pair of spaced vertical bars 50 which extend perpendicularly of the hitch bar. The vertical bars 50 include vertically spaced and aligned holes, one pair forming the pivot 44 with support bar 46 and the other pair aligning with a pair of holes in vertical bars 50 and forming a lock 52 with the support bar. Again, a pin and padlock may be used to secure the pin against removal.

Turning now to FIG. 3A, ramp assembly 10 is shown in its storage position when not attached with a vehicle and in its locking position when locked in receiver 48, behind the closed tail gate of the vehicle.

FIG. 3B shows ramp, lock assembly 10 attached with the vehicle in the loading position.

When ramp locking assembly 10 is moved from storage, usually by a single person, it is rolled on wheels 20 to a position adjacent the rear of the vehicle. Hitch bar 46 is positioned to extend perpendicularly from the rear side of lower ramp section 16 just beneath the upper end of upper ramp section 14 at a position slightly lower than the opening of receiver 48. The hitch bar is easily positioned in the opening and the entire assembly 10 is moved toward the receiver causing the hitch bar 46 to slide into the operative position where it is locked in position. Ramp assembly 10 is now in its locking position as the tailgate of the vehicle cannot be lowered.

Figure 3C:
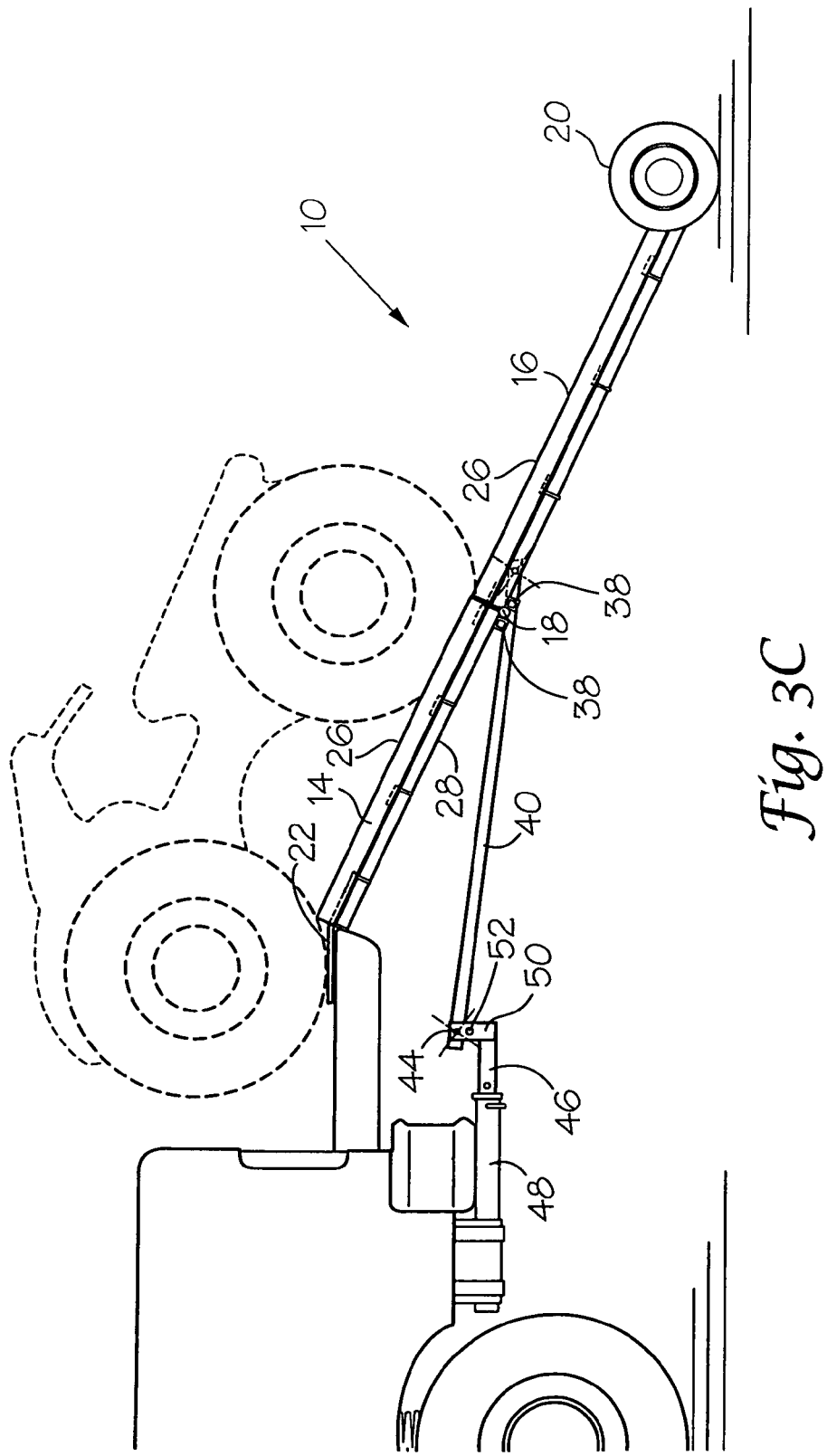
FIG. 3C is a side view of the ramp assembly in an extended position.

When mounting the assembly for use as a ramp, upper ramp section 14 is raised to a position, as shown in FIG. 3C, above the tailgate, the hitch bar 46 is again positioned as before described into the opening of the receiver and the assembly 10 is moved forward to position the hitch bar 46 in receiver 48. As shown in FIG. 3B, the tailgate is lowered and ramp upper section 14 is lowered into the shown position.

Ears 22 engage opposite sides of the tailgate positioning the upper end of ramp 12 in position adjacent the tailgate. Lower ramp 16 moves into the diagonal position as shown. The location of ears 22 combined with the mounting of support beam 40 with lower ramp 16 and receiver 48 rotational movement of the assembly is prevented. Further, support of beam 40 fixed at each end as described provides a lock against longitudinal movement preventing the ramp from sliding longitudinally and off the tailgate.

As seen in FIGS. 1, 2 and 3B, when ramp 12 is in the loading position, the vertical adjacent ends of angle rods 26 engage along their length. Also, the adjacent vertical faces of end transverse support members 38 engage over their surface area to support ramp 12 along the diagonal line shown in FIGS. 1 and 3B.

While a preferred embodiment of the invention has been described using specific terms, such description is for illustrative purposes only, and it is to be understood that changes and variations may be made without departing from the spirit or scope of the following claims.

What is claimed is:

1. A ramp assembly for use with a truck having a bed with a tailgate and a hitch receiver comprising:
    a ramp having an upper section and a lower section pivoted together at adjacent ends;
    a hitch bar having a perpendicular extension arranged on a first end and a second end adapted to be received in and secured with said hitch receiver;
    longitudinal support members extending the length of each said ramp section intermediate sides thereof forming a channel;
    a support beam pivoted at a first end with said lower ramp section within said channel between said support members adjacent said pivoted adjacent ends of said ramp sections and at a second end with said perpendicular extension;
    said support beam pivoting between a first locking position and a second loading position, wherein,
    with said hitch bar connected with said hitch receiver, said support beam is positionable in said first locking position within said channel with said upper and lower ramp sections folded parallel and extending in fixed position vertically behind and separated from said tailgate in its raised position and with said upper ramp section adjacent said tailgate in said second loading position with said upper and lower ramp sections unfolded and extending diagonally end-to-end along said adjacent ends with a second end of said upper ramp section engaged with said tailgate and said lower ramp section supported on ground.

2. The assembly of claim 1 wherein said upper and lower ramp sections are made of aluminum.

3. The assembly of claim 1 wherein said ramp sections each comprise flooring of metal screening with angle rods forming side rails of said ramp sections.

4. The assembly of claim 1 wherein said second end of said upper ramp section includes an outwardly extending spaced pair of shaped ears which engage said upper ramp section with said tailgate when said assembly is in said loading position.

5. The assembly of claim 1 including a pair of wheels connected with said lower ramp section adjacent a second end of said lower ramp section, said wheels assisting in transport of said assembly when separated from said vehicle.

6. The assembly of claim 1 wherein said perpendicular extension and said second end of said support beam include a lock assembly comprised of aligned holes through said extension and said support beam and a locking member, which is received in said holes, for locking said support beam in fixed adjusted position with said extension.

7. The assembly of claim 1 wherein said support beam is of a length greater than said upper ramp section allowing said upper ramp section to be folded to extend parallel with said lower ramp section with said support beam sandwiched there between.

8. The assembly of claim 3 wherein adjacent end portions of said angle rods are engaged when said ramp is in said loading position, said engaging ends of said angle rods assisting to maintain said upper and lower ramp sections generally along a single plane.

9. A method of mounting a ramp assembly with a vehicle, preferably a pickup truck having a hitch receiver beneath a tailgate including:
- providing a ramp having an upper ramp section pivoted with a lower ramp section, a support beam having one end pivotally connected with said lower ramp section and a second end pivotally connected with a hitch bar receivable with said hitch receiver;
- providing said lower ramp section with a pair of wheels adjacent a second end thereof;
- arranging said upper and lower ramp sections in a generally parallel end-to-end position with said wheels supporting said ramp assembly and with said support beam extending between said upper and lower ramp sections positioning said hitch bar perpendicular of said support beam;
- positioning an end of said hitch bar in said open end of said hitch receiver and rolling said ramp assembly in said folded position toward hitch receiver moving said hitch bar into said hitch receiver; and,
- locking said hitch bar with said hitch receiver positioning said ramp in said folded, fixed vertical position behind said tailgate, locking said tailgate in closed position.

* * * * *